United States Patent
Goldman et al.

(10) Patent No.: US 7,897,189 B2
(45) Date of Patent: Mar. 1, 2011

(54) APPARATUS AND TECHNIQUES FOR FREEZING AND THAWING OF AGRICULTURAL PRODUCE

(75) Inventors: Genady Goldman, Beer Sheva (IL); Alexsander Tchichelnitsky, Beer Sheva (IL)

(73) Assignee: Fresh Defrost Ltd., Rishon Le Zion (IL)

( * ) Notice: Subject to any disclaimer, the term of this patent is extended or adjusted under 35 U.S.C. 154(b) by 863 days.

(21) Appl. No.: 11/600,488

(22) Filed: Nov. 15, 2006

(65) Prior Publication Data

US 2007/0110859 A1  May 17, 2007

(30) Foreign Application Priority Data

Nov. 16, 2005 (IL) .................................... 172001

(51) Int. Cl.
*A23B 7/024* (2006.01)
*A23L 3/00* (2006.01)

(52) U.S. Cl. ........................ 426/327; 426/524

(58) Field of Classification Search ............... 426/327, 426/524, 237, 241–42, 393, 418–419, 443–444, 426/465, 467, 520
See application file for complete search history.

(56) References Cited

U.S. PATENT DOCUMENTS

| | | | |
|---|---|---|---|
| 1,448,512 A | 3/1923 | Benjamin | |
| 2,703,761 A | 3/1955 | Todd | |
| 3,927,794 A * | 12/1975 | Erdman | ...................... 220/268 |
| 4,332,824 A | 6/1982 | Kahn et al. | |
| 4,350,711 A | 9/1982 | Kahn et al. | |
| 4,356,195 A | 10/1982 | Kahn et al. | |
| 4,390,550 A | 6/1983 | Kahn et al. | |
| 4,390,555 A * | 6/1983 | Levinson | ..................... 426/234 |
| 4,418,082 A | 11/1983 | Kahn et al. | |
| 4,530,278 A * | 7/1985 | Sarig et al. | ..................... 99/547 |
| 4,551,384 A | 11/1985 | Aston et al. | |
| 4,647,469 A | 3/1987 | Jakobsson et al. | |
| 5,020,237 A | 6/1991 | Gross et al. | |
| 5,035,909 A | 7/1991 | Lomelin et al. | |
| 5,135,122 A | 8/1992 | Gross et al. | |
| 5,256,438 A | 10/1993 | Lewis et al. | |
| 5,595,775 A * | 1/1997 | Tishel | ........................ 426/241 |

(Continued)

FOREIGN PATENT DOCUMENTS

CA  1043160  11/1978

(Continued)

OTHER PUBLICATIONS

International Freezing Systems, Inc. IQF Tunnel Freezer. 2003. Accessed on the Internet: http://www.blastfreezer.com/iqf_tunnel.htm.*

(Continued)

*Primary Examiner*—Rena L Dye
*Assistant Examiner*—Saeeda Latham
(74) *Attorney, Agent, or Firm*—Abelman, Frayne & Schwab

(57) ABSTRACT

A method for preserving fresh cut or uncut agricultural produce including removing moisture from the fresh cut or uncut agricultural produce in an amount equal to between 5%-20% of the weight of the fresh cut or uncut agricultural produce and thereafter, freezing the fresh cut or uncut agricultural produce.

26 Claims, 6 Drawing Sheets

U.S. PATENT DOCUMENTS

| 6,004,607 | A | 12/1999 | Brackebusch et al. |
|---|---|---|---|
| 2002/0040643 | A1 | 4/2002 | Ware |
| 2004/0096559 | A1 | 5/2004 | Swanson et al. |

FOREIGN PATENT DOCUMENTS

| EP | 0572745 | | 12/1993 |
|---|---|---|---|
| EP | 1525801 | | 4/2005 |
| ES | 2057832 | | 10/1994 |
| ES | 20071391 | | 5/2007 |
| ES | 2308926 | | 12/2008 |
| FR | 2878412 | | 6/2006 |
| GB | 2005983 | * | 2/1979 |
| GB | 2005983 | | 5/1979 |
| WO | WO 2004/071249 | | 8/2004 |
| WO | WO2007/057888 | | 5/2007 |

OTHER PUBLICATIONS

All Sands. Defrosting Food Safely. Accessed on the internet: http://www.allsands.com/food/howto/defrosting_xcc_gn.htm.*

"Drying, shrinkage and rehydration characteristics of Kiwifruits during hot air and microwave drying", M. Maskan, Journal of Food Engineering, 48, 177-182, 2001.

"Kinetics of moisture transfer during air drying of balanced and/or osmotically dehydrated mango", A. Nieto, et al., Journal of Food Engineering, 50, 175-185, 2001.

"Analysis of shrinkage phenomenon of whole sweet cherry fruits (prunus avium) during convective dehydration with very simple models", M.R. Ochoa, et al., Journal of Food Engineering, 2006.

"Drying kinetics of pomegranate arils", A.R.P. Kingsley, et al., Journal of Food Engineering, 2006.

* cited by examiner

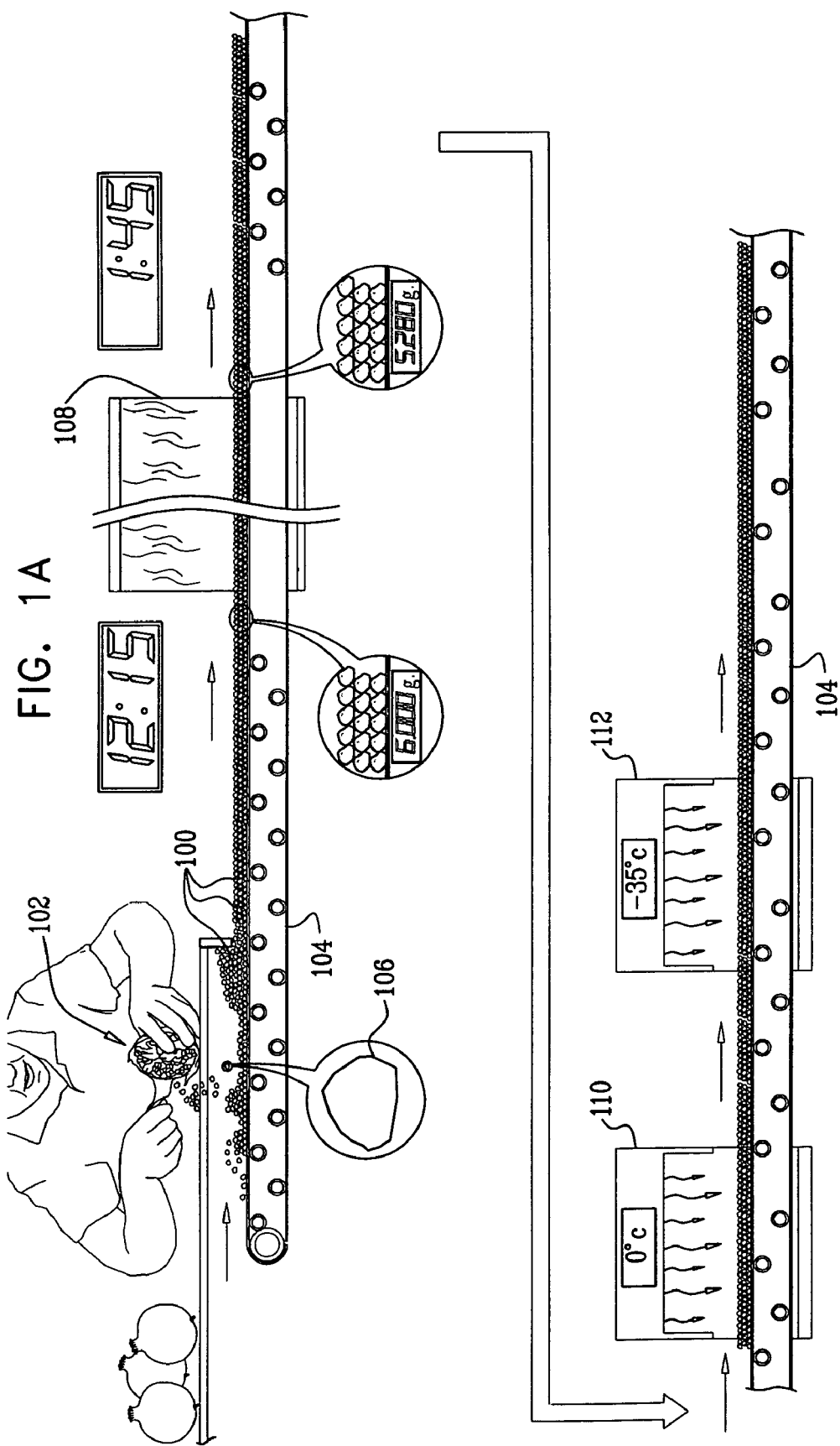

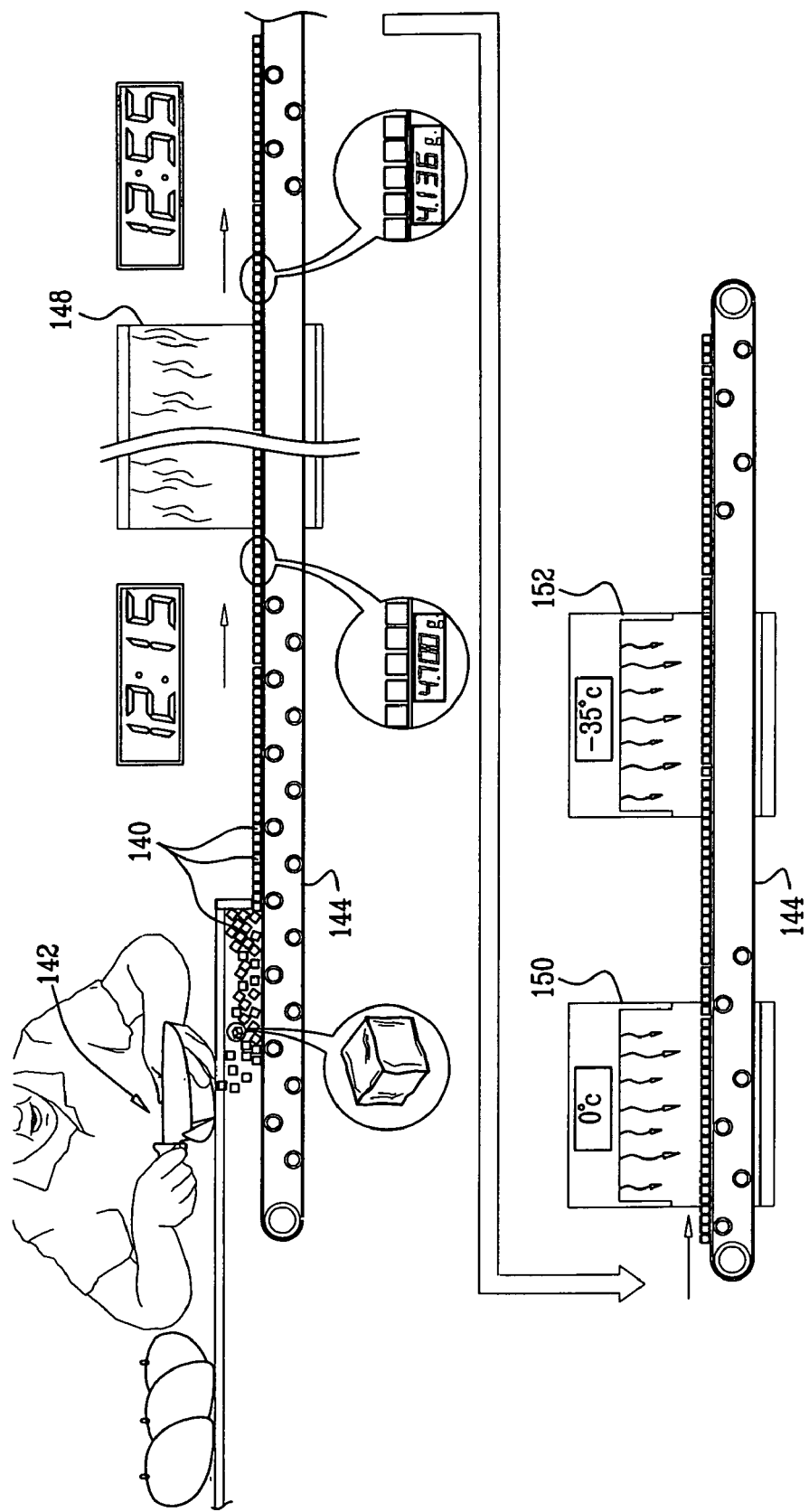

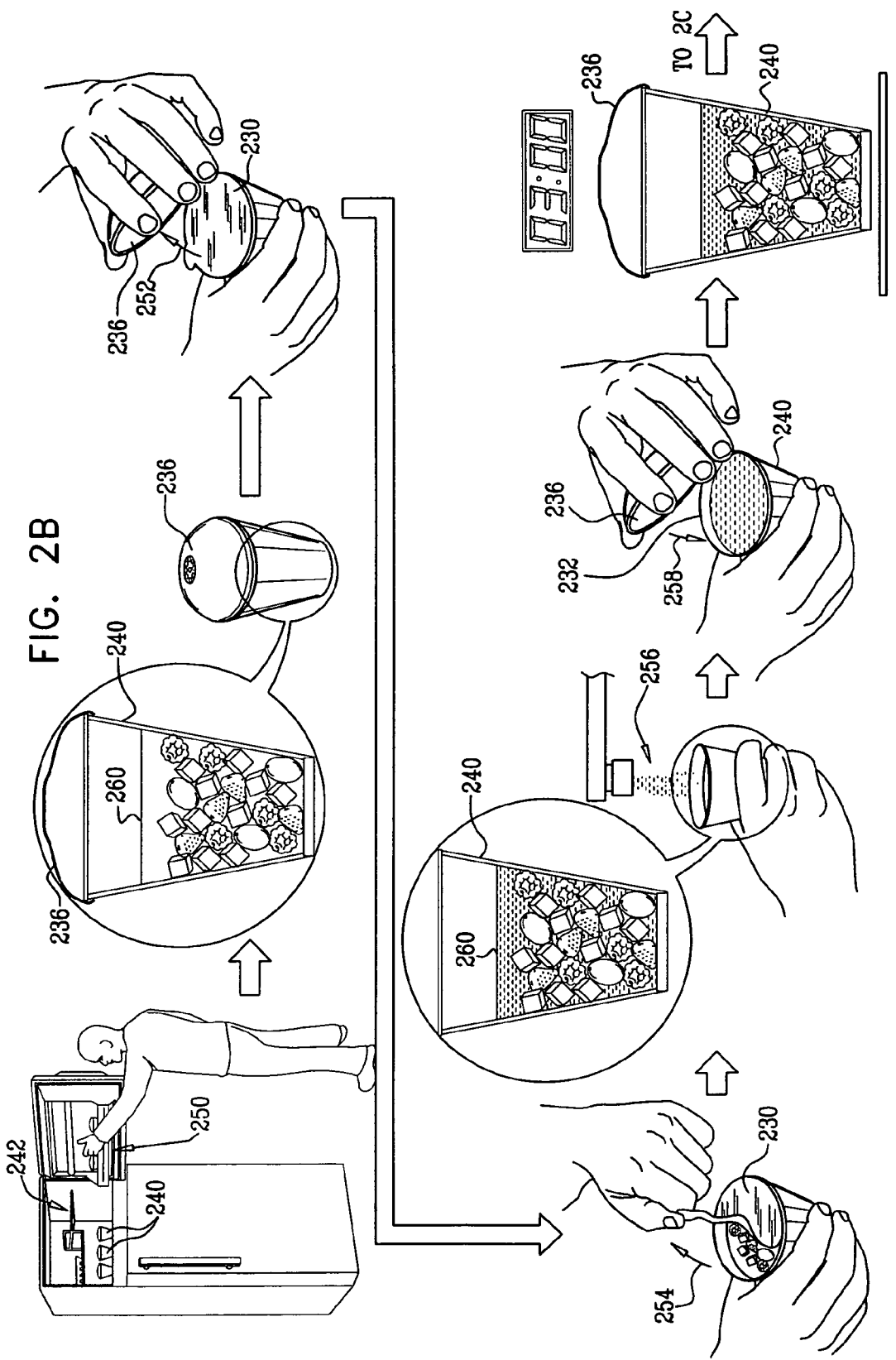

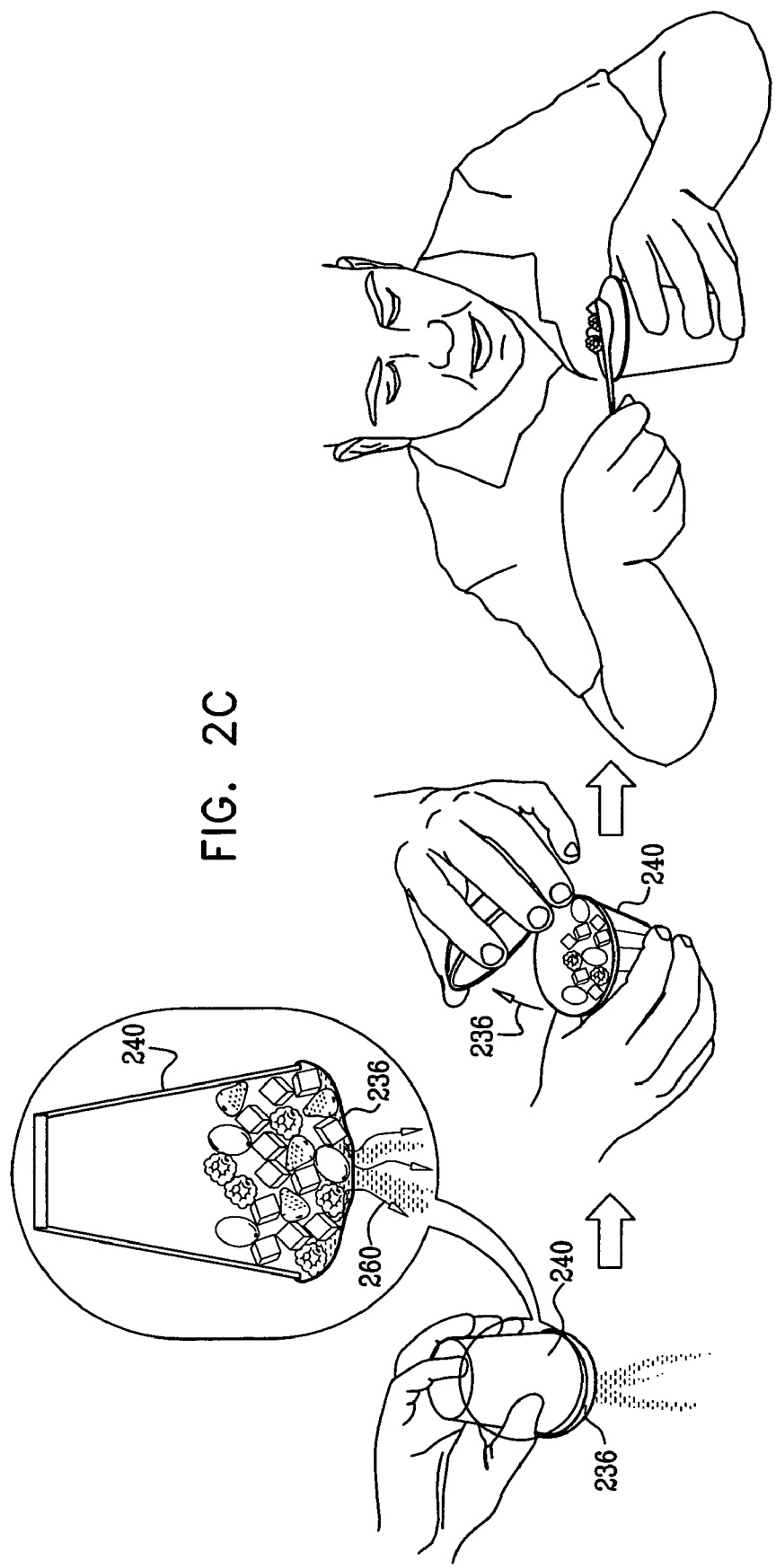

APPARATUS AND TECHNIQUES FOR FREEZING AND THAWING OF AGRICULTURAL PRODUCE

FIELD OF THE INVENTION

The present invention relates to system, apparatus and techniques for freezing and thawing of agricultural produce.

BACKGROUND OF THE INVENTION

The following published documents are believed to represent the current state of the art and the contents thereof are hereby incorporated by reference:

U.S. Pat. Nos. 5,595,775; 5,256,438; 5,135,122; 5,020,237; 4,647,469; 4,551,384; 4,418,082; 4,390,550; 4,356,195; 4,350,711 and 4,332,824;

U.K. Published Patent Application No.: 2005983A;

"Drying, shrinkage and rehydration characteristics of Kiwifruits during hot air and microwave drying", M. Maskan, Journal of Food Engineering, 48, 177-182, (2001);

"Kinetics of moisture transfer during air drying of blanched and/or osmotically dehydrated mango", A. Nieto, M. A. Castro and S. M Alzamora, Journal of Food Engineering, 50, 175-185, (2001);

"Analysis of shrinkage phenomenon of whole sweet cherry fruits (*Prunus avium*) during convective dehydration with very simple models", M. R. Ochoa, A. G. Kessler, B. N. Pirone, C. A Marquez and A. De Michelis, Journal of Food Engineering, (2006); and "Drying kinetics of pomegranate arils", A. R. P. Kingsley and D. B. Singh, Journal of Food Engineering, (2006).

SUMMARY OF THE INVENTION

The present invention seeks to provide improved apparatus and techniques for freezing and thawing of agricultural produce which maintains fresh-like qualities in the frozen produce when thawed.

There is thus provided in accordance with a preferred embodiment of the present invention a method for preserving uncut fresh agricultural produce including manually handling the uncut fresh agricultural produce, thereafter, removing moisture from the uncut fresh agricultural produce in an amount equal to between 5%-20% of the weight of the uncut fresh agricultural produce at a rate which does not exceed approximately $30 \times 10^{-6}$ kg moisture/sec per area unit of the produce in $meter^2$ and thereafter, freezing the uncut fresh agricultural produce.

Preferably, the manually handling is effective to generally eliminate damage to an outer peel of the uncut fresh agricultural produce.

There is also provided in accordance with another preferred embodiment of the present invention a method for preserving uncut fresh agricultural produce including non-manually handling the uncut fresh agricultural produce, thereafter, removing moisture from the uncut fresh agricultural produce in an amount equal to between 5%-20% of the weight of the uncut fresh agricultural produce at a rate which does not exceed approximately $60 \times 10^{-6}$ kg moisture/sec per area unit of the produce in $meter^2$; and thereafter, freezing the uncut fresh agricultural produce.

There is further provided in accordance with yet another preferred embodiment of the present invention a method for preserving fresh cut agricultural produce including removing moisture from the fresh cut agricultural produce in an amount equal to between 5%-20% of the weight of the fresh cut agricultural produce at a rate which does not exceed approximately $300 \times 10^{-6}$ kg moisture/sec per area unit of the produce in $meter^2$ and thereafter, freezing the fresh cut agricultural produce.

There is even further provided in accordance with still another preferred embodiment of the present invention a method of storing agricultural produce including removing moisture from the agricultural produce in an amount equal to between 5%-20% of the weight of the agricultural produce, thereafter, freezing the agricultural produce and thereafter, adding liquid to the agricultural produce and defrosting the agricultural produce in the presence of the liquid.

There is yet further provided in accordance with yet another preferred embodiment of the present invention a method for storing agricultural produce including removing moisture from the agricultural produce in an amount equal to between 5%-20% of the weight of the agricultural produce, thereafter, freezing the agricultural produce and storing it in a container for storing frozen agricultural produce and having a container opening, sealing the opening of the container, storing the container containing the agricultural produce under freezing conditions, unsealing the opening of the container, supplying a liquid to the agricultural produce in the container, defrosting the agricultural produce in the container in the presence of the liquid, removably attaching an apertured cap to the container and pouring out the liquid from the container through the apertured cap, thereby permitting the liquid, but not the produce, to pass out of the container.

Preferably, the removing moisture includes removing moisture in an amount equal to approximately 10%-14% of the weight of the agricultural produce. More preferably, the removing moisture includes removing moisture in an amount equal to approximately 12% of the weight of the agricultural produce.

Preferably, the removing moisture includes transporting the agricultural produce through a moisture removal chamber. Additionally, the removing moisture includes transporting the agricultural produce through a controlled temperature chamber. Additionally or alternatively, the removing moisture includes transporting the agricultural produce through a controlled air flow chamber. More preferably, the removing moisture includes transporting the agricultural produce through a controlled temperature and air flow chamber.

Alternatively, the removing moisture includes transporting the agricultural produce through a convection drying chamber. Alternatively, the removing moisture includes transporting the agricultural produce through at least one of a microwave chamber, an infrared chamber, a convection chamber, a chamber having fluidized bed technology and a chamber having vacuum drying technology.

Preferably, the method also includes, prior to the freezing, pre-cooling the agricultural produce to a temperature between 0° C. and 5° C.

Preferably, the freezing includes freezing the agricultural produce to a temperature between −40° C. and −35° C. Additionally or alternatively, the freezing includes quick freezing the agricultural produce. Alternatively or additionally, the freezing includes freezing the agricultural produce by employing IQF freezing technology.

Preferably, the method also includes, following the freezing, adding liquid to the agricultural produce and defrosting the agricultural produce in the presence of the liquid.

Preferably, the method for storing includes storing different types of the agricultural produce mixed together.

Preferably, the defrosting includes defrosting the agricultural produce at room temperature. Additionally, the defrosting the agricultural produce at room temperature includes defrosting the agricultural produce at room temperature for a duration of approximately 3 to 5 minutes. Alternatively, the defrosting includes defrosting the agricultural produce in a microwave oven. Additionally, the defrosting the agricultural produce in a microwave oven includes defrosting the agricultural produce in a microwave oven for a duration of approximately 15 to 30 seconds.

There is also provided in accordance with still another preferred embodiment of the present invention apparatus for preserving manually handled uncut fresh agricultural produce including a chamber operative to remove moisture from the manually handled uncut fresh agricultural produce in an amount equal to between 5%-20% of the weight of the manually handled uncut fresh agricultural produce at a rate which does not exceed approximately $30 \times 10^{-6}$ kg moisture/sec per area unit of the produce in meter$^2$ and at least one freezing device operative to freeze the manually handled uncut fresh agricultural produce.

There is further provided in accordance with another preferred embodiment of the present invention apparatus for preserving non-manually handled uncut fresh agricultural produce including a chamber operative to remove moisture from the non-manually handled uncut fresh agricultural produce in an amount equal to between 5%-20% of the weight of the non-manually handled uncut fresh agricultural produce at a rate which does not exceed approximately $60 \times 10^{-6}$ kg moisture/sec per area unit of the produce in meter$^2$ and at least one freezing device operative to freeze the non-manually handled uncut fresh agricultural produce.

There is even further provided in accordance with yet another preferred embodiment of the present invention apparatus for preserving fresh cut agricultural produce including a chamber operative to remove moisture from the fresh cut agricultural produce in an amount equal to between 5%-20% of the weight of the fresh cut agricultural produce at a rate which does not exceed approximately $300 \times 10^{-6}$ kg moisture/sec per area unit of the produce in meter$^2$ and at least one freezing device operative to freeze the fresh cut agricultural produce.

Preferably, the chamber is operative to remove moisture in an amount equal to approximately 10%-14% of the weight of the agricultural produce. More preferably, the chamber is operative to remove moisture in an amount equal to approximately 12% of the weight of the agricultural produce.

Preferably, the chamber is a controlled temperature and air flow chamber. Alternatively, the chamber is a controlled air flow chamber. Alternatively, the chamber is a controlled temperature chamber.

Preferably, the chamber is a convection drying chamber. Alternatively, the chamber is at least one of a microwave chamber, an infrared chamber, a convection chamber, a chamber having fluidized bed technology and a chamber having vacuum drying technology.

Preferably, the apparatus also includes a cooling device operative to pre-cool the agricultural produce prior to the freezing thereof, to a temperature between 0° C. and 5° C.

Preferably, the at least one freezing device is operative to freeze the agricultural produce to a temperature between −40° C. and −35° C. Additionally or alternatively, the at least one freezing device is operative to quick freeze the agricultural produce. Alternatively or additionally, the at least one freezing device employs IQF freezing technology.

There is still further provided in accordance with still another preferred embodiment of the present invention apparatus for storing agricultural produce including a container for storing the frozen agricultural produce and having a container opening, a seal formed over the opening of the container, a cap removably attached to the container and disposed over the seal, the cap being apertured to permit liquid, but not the produce, to pass therethrough and out of the container.

Preferably, the container has indicated thereon a line indicating a desired level to which the liquid should be added to the container prior to defrosting.

BRIEF DESCRIPTION OF THE DRAWINGS

The present invention will be understood and appreciated more fully from the following detailed description, taken in conjunction with the drawings in which:

FIGS. 1A, 1B and 1C are simplified illustrations of apparatus and techniques for preserving agricultural produce in accordance with three alternative embodiments of the present invention; and FIGS. 2A, 2B and 2C are simplified illustrations of apparatus and techniques for freezing, packaging, storing, defrosting and utilizing agricultural produce in accordance with a preferred embodiment of the present invention.

DETAILED DESCRIPTION OF PREFERRED EMBODIMENTS

Figure 1B:
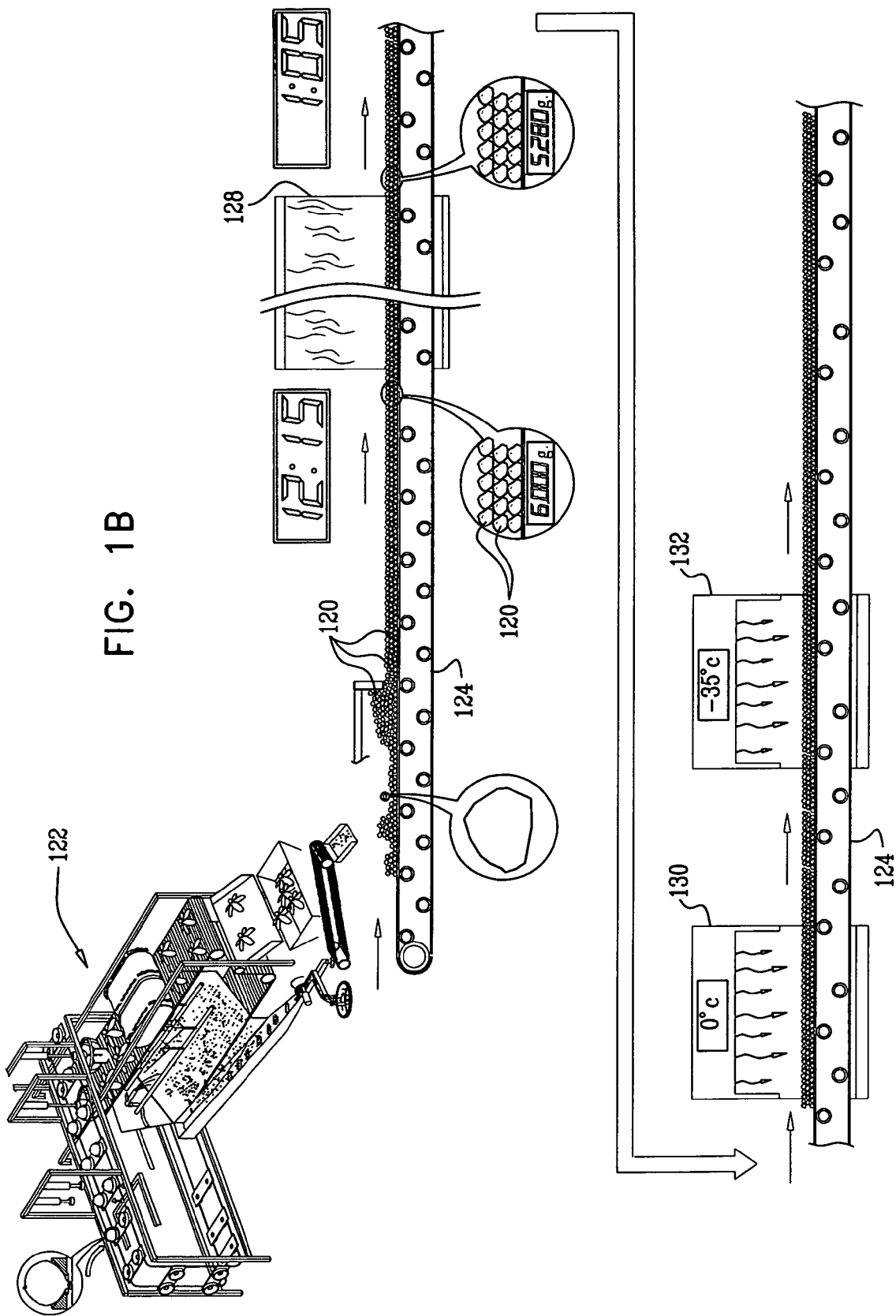

Reference is now made to FIGS. 1A, 1B and 1C, which are simplified illustrations of apparatus and techniques for preserving agricultural produce in accordance with three alternative embodiments of the present invention.

Turning to FIG. 1A, there is seen a method and apparatus for preserving uncut fresh agricultural produce including manually handling the uncut fresh agricultural produce, thereafter, removing moisture from the uncut fresh agricultural produce in an amount equal to between 5%-20% of the weight of the uncut fresh agricultural produce at a rate which does not exceed approximately $30 \times 10^{-6}$ kg moisture/sec per area unit of produce in meter$^2$ and thereafter, freezing the uncut fresh agricultural produce.

In the illustrated method, pomegranate arils 100 are separated from fresh pomegranates by hand, as indicated at reference numeral 102, and placed on a conveyor 104 in a manner designed so as to generally eliminate or minimize damage to the outer peel 106 thereof.

The conveyor 104 transports the pomegranate arils 100 through a moisture removal chamber 108, preferably a controlled temperature and air flow chamber, in order to remove moisture therefrom, in an amount preferably equal to between approximately 5%-20%, and more preferably equal to between approximately 10%-14%, of the weight of the pomegranate arils 100, at a rate which does not exceed approximately $30 \times 10^{-6}$ kg moisture/sec per area unit of produce in meter$^2$. In the illustrated exemplary embodiment, moisture removal takes approximately 1.5 hours and preferably results in removal of moisture equal to approximately 12% of the weight of the pomegranate arils 100.

It is appreciated that moisture removal chamber 108 may be any suitable controlled drying chamber utilizing any suitable drying technology, such as microwave, infra-red, convection, fluidized bed or vacuum drying technologies and various combinations thereof. Convection drying is presently preferred.

Following moisture removal thereof as described hereinabove, the pomegranate arils 100 are preferably pre-cooled in a cooler 110 to a temperature between 0° C.-5° C. and are then preferably quick frozen, preferably to a temperature between −40° C. and −35° C., preferably in a freezer 112 employing IQF (individual quick frozen) freezing technology. Alternatively, the pre-cooling step may be obviated.

Turning to FIG. 1B, there is seen a method and apparatus for preserving uncut fresh agricultural produce including non-manually handling the uncut fresh agricultural produce, thereafter, removing moisture from the uncut fresh agricultural produce in an amount equal to between 5%-20% of the weight of the uncut fresh agricultural produce at a rate which does not exceed approximately $60 \times 10^{-6}$ kg moisture/sec per unit area of produce in meter$^2$ and thereafter, freezing the uncut fresh agricultural produce.

In the illustrated method, pomegranate arils 120 are separated from fresh pomegranates by use of a machine 122, such as, for example, the type described in published PCT application No. WO/2004/071249. Arils 120 are placed on a conveyor 124. The conveyor 124 transports the pomegranate arils 120 through a moisture removal chamber 128, preferably a controlled temperature and air flow chamber, in order to remove moisture therefrom, in an amount preferably equal to between approximately 5%-20%, and more preferably between approximately 10%-14%, of the weight of the pomegranate arils 120, at a rate which does not exceed approximately $60 \times 10^{-6}$ kg moisture/sec per area unit of produce in meter$^2$. In the illustrated exemplary embodiment, moisture removal takes approximately 50 minutes and preferably results in removal of moisture equal to approximately 12% of the weight of pomegranate arils 120.

It is appreciated that moisture removal chamber 128 may be any suitable controlled drying chamber utilizing any suitable drying technology, such as microwave, infra-red, convection, fluidized bed or vacuum drying technologies and various combinations thereof. Convection drying is presently preferred.

Following moisture removal thereof as described hereinabove, the pomegranate arils 120 are preferably pre-cooled in a cooler 130 to a temperature between 0° C.-5° C. and are then preferably quick frozen, preferably to a temperature between −40° C. and −35° C., preferably in a freezer 132 employing IQF freezing technology. Alternatively, the pre-cooling step may be obviated.

Turning to FIG. 1C, there is seen a method and apparatus for preserving fresh cut agricultural produce including manually handling the fresh cut agricultural produce, thereafter, removing moisture from the fresh cut agricultural produce in an amount equal to between 5%-20% of the weight of the fresh cut agricultural produce at a rate which does not exceed approximately $300 \times 10^{-6}$ kg moisture/sec per area unit of produce in meter$^2$ and thereafter, freezing the fresh cut agricultural produce.

In the illustrated method, fresh cut pieces 140 of mango are prepared from fresh mangos by hand, as indicated at reference numeral 142. Alternatively, fresh cut pieces 140 of mango may be non-manually prepared. Fresh cut pieces 140 of mango are placed on a conveyor 144. The conveyor 144 transports the fresh cut pieces 140 of mango through a moisture removal chamber 148, preferably a controlled temperature and air flow chamber, in order to remove moisture therefrom, in an amount preferably equal to between approximately 5%-20%, and more preferably between approximately 10%-14%, of the weight of the fresh cut pieces 140 of mango, at a rate which does not exceed approximately $300 \times 10^{-6}$ kg moisture/sec per area unit of produce in meter$^2$. In the illustrated exemplary embodiment, moisture removal takes approximately 40 minutes and preferably results in removal of moisture equal to approximately 12% of the weight of fresh cut pieces 140 of mango.

It is appreciated that moisture removal chamber may be any suitable controlled drying chamber utilizing any suitable drying technology, such as microwave, infra-red, convection, fluidized bed or vacuum drying technologies and various combinations thereof. Convection drying is presently preferred.

Following moisture removal thereof as described hereinabove, the fresh cut pieces 140 of mango are preferably pre-cooled in a cooler 150 to a temperature between 0° C.-5° C. and are then preferably quick frozen, preferably to a temperature between −40° C. and −35° C., preferably in a freezer 152 employing IQF freezing technology. Alternatively, the pre-cooling step may be obviated.

Although the invention has been described hereinabove with respect to pomegranate arils and fresh cut pieces of mango, it is appreciated that it is applicable to a great many types of agricultural produce. Data for various types of uncut produce appears in Table 1 hereinbelow and data for various types of fresh cut produce appears in Table 2 hereinbelow. It is seen that for each type of produce various drying rates and corresponding quality metrics, such as turgor, general taste, drip loss and dried tissue layer as a percentage by weight of produce weight, are indicated.

TABLE 1

UNCUT PRODUCE

| Type | Drying Temp. (° C.) | Drying rate per unit area of product (kg m$^{-2}$ s$^{-1}$) × 10$^{-6}$ | Dehydration, % | Turgor on 0-5 scale (5 is best) | General taste on 0-5 scale (5 is best) | Drip loss, % |
|---|---|---|---|---|---|---|
| Cherry | 45 | 16 | 5 | 4 | 3.9 | 6.1 |
| (Sweet) | 45 | 16 | 8 | 4.4 | 4.4 | 4.3 |
| Manually | 45 | 16 | 12 | 4.7 | 4.8 | 0.2 |
| handled | 45 | 16 | 18 | 4.2 | 3.4 | 0.1 |
|  | 50 | 27 | 12 | 4.7 | 4.7 | 0.8 |
|  | 60 | 59 | 12 | 3.9 | 3.5 | 2.2 |
|  | Control |  | 0 | 3.3 | 3.1 | 7.3 |
| Pomegranate | 40 | 7 | 12 | 4.5 | 4.6 | 0.4 |
| (Wonderful) | 50 | 30 | 6 | 2.9 | 3.2 | 6.2 |
| Manually | 50 | 30 | 8 | 3.7 | 3.6 | 4.2 |
| handled | 50 | 30 | 10 | 4.1 | 3.9 | 3.9 |
|  | 50 | 30 | 12 | 4.5 | 4.6 | 1.2 |
|  | 50 | 30 | 14 | 4.5 | 4.6 | 0.6 |
|  | 50 | 30 | 16 | 3.7 | 3.9 | 0.4 |

TABLE 1-continued

UNCUT PRODUCE

| Type | Drying Temp. (° C.) | Drying rate per unit area of product (kg m$^{-2}$ s$^{-1}$) × 10$^{-6}$ | Dehydration, % | Turgor on 0-5 scale (5 is best) | General taste on 0-5 scale (5 is best) | Drip loss, % |
|---|---|---|---|---|---|---|
| | 60 | 59 | 12 | 4.2 | 4.2 | 1.8 |
| | 70 | 116 | 12 | 4 | 4 | 2.5 |
| | Control | | 0 | 2.3 | 2.6 | 13.2 |
| Pomegranate | 40 | 5 | 12 | 4.4 | 4.3 | 0.6 |
| (Hershkovich) | 45 | 11 | 12 | 4.4 | 4.3 | 0.7 |
| Manually | 50 | 19 | 12 | 4.3 | 4.3 | 1.1 |
| handled | 60 | 77 | 12 | 4.1 | 4 | 1.6 |
| | 70 | 121 | 12 | 3.7 | 3.8 | 3.2 |
| | Control | | 0 | 2.2 | 2.5 | 12.3 |
| Pomegranate | 25 | 2 | 12 | 4.2 | 3.8 | 0.6 |
| (Rosh- | 40 | 10 | 12 | 4.2 | 3.8 | 0.6 |
| Hapered) | 43 | 17 | 12 | 4 | 3.7 | 1.2 |
| Manually | 45 | 26 | 12 | 3.6 | 3.2 | 3.2 |
| handled | 50 | 46 | 12 | 3.2 | 2.8 | 6.2 |
| | 70 | 89 | 12 | 3 | 2.5 | 7.4 |
| | Control | | 0 | 1.7 | 2.1 | 18.7 |
| Pomegranate | 40 | 16 | 12 | 4.3 | 4.1 | 0.8 |
| (105) | 45 | 27 | 12 | 4.3 | 4.1 | 1.2 |
| Non-Manually | 50 | 45 | 12 | 4.3 | 4.1 | 1.2 |
| handled | Control | | 0 | 2.3 | 2.3 | 14.6 |
| Blueberry | 45 | 11 | 12 | 4.8 | 4.8 | 0 |
| | 60 | 32 | 12 | 4.7 | 4.1 | 0.2 |
| | Control | | 0 | 4.1 | 3.9 | 0.7 |

Based on the experimental results of the inventors, the optimal parameters and corresponding experimental results for each of the various types of produce of Table 1 are shown in bold in Table 1.

As seen in Table 1, for Sweet Cherries, the optimal parameters and corresponding experimental results are generally as follows:

Drying Temperature: 45° C.

Drying Rate per Unit Area: 16 kg/(sec*m$^2$*10$^6$)

Dehydration Percentage: 12%

Turgor: 4.7 (on a scale of 0-5 with 5 being best)

General Taste Score: 4.8 (on a scale of 0-5 with 5 being best)

Drip Loss Percentage: 0.2%

As seen in Table 1, two sets of optimal parameters were found. The optimal parameters and corresponding experimental results for Pomegranate arils (Wonderful variety) are respectively as follows:

Drying Temperature: 50 and 50° C.

Drying Rate per Unit Area: 30 and 30 kg/(sec*m$^2$*10$^6$)

Dehydration Percentage: 12% and 14%

Turgor: 4.5 and 4.5 (on a scale of 0-5 with 5 being best)

General Taste Score: 4.6 and 4.6 (on a scale of 0-5 with 5 being best)

Drip Loss Percentage: 1.2% and 0.6%

As seen in Table 1, the optimal parameters and corresponding experimental results for Pomegranate arils (Hershkovitz variety) are as follows:

Drying Temperature: 45° C.

Drying Rate per Unit Area: 11 kg/(sec*m$^2$*10$^6$)

Dehydration Percentage: 12%

Turgor: 4.4 (on a scale of 0-5 with 5 being best)

General Taste Score: 4.3 (on a scale of 0-5 with 5 being best)

Drip Loss Percentage: 0.7%

As seen in Table 1, the optimal parameters and corresponding experimental results for Pomegranate arils (Rosh-Hapered variety) are as follows:

Drying Temperature: 40° C.

Drying Rate per Unit Area: 10 kg/(sec*m$^2$*10$^6$)

Dehydration Percentage: 12%

Turgor: 4.2 (on a scale of 0-5 with 5 being best)

General Taste Score: 3.8 (on a scale of 0-5 with 5 being best)

Drip Loss Percentage: 0.6%

As seen in Table 1, two sets of optimal parameters were found. The optimal parameters and corresponding experimental results for Pomegranate arils (105 variety) are respectively as follows:

Drying Temperature: 45 and 50° C.

Drying Rate per Unit Area: 27 and 45 kg/(sec*m$^2$*10$^6$)

Dehydration Percentage: 12% and 12%

Turgor: 4.3 and 4.3 (on a scale of 0-5 with 5 being best)

General Taste Score: 4.1 and 4.1 (on a scale of 0-5 with 5 being best)

Drip Loss Percentage: 1.2% and 1.2%

As seen in Table 1, the optimal parameters and corresponding experimental results for Blueberries are as follows:

Drying Temperature: 45° C.

Drying Rate per Unit Area: 11 kg/(sec*m$^2$*10$^6$)

Dehydration Percentage: 12%

Turgor: 4.8 (on a scale of 0-5 with 5 being best)

General Taste Score: 4.8 (on a scale of 0-5 with 5 being best)
Drip Loss Percentage: 0%

Turgor: 3.8 (on a scale of 0-5 with 5 being best)
General Taste Score: 3.6 (on a scale of 0-5 with 5 being best)

TABLE 2

FRESH CUT

| Type\Parameter | Drying Temp. (° C.) | Drying rate per unit area of product (kg m$^{-2}$ s$^{-1}$) × 10$^{-6}$ | Dehydration, % | Turgor on 0-5 scale (5 is best) | General taste score on 0-5 scale (5 is best) | Drip loss, % | Dried tissue layer, % |
|---|---|---|---|---|---|---|---|
| Mango | 27 | 87 | 14 | 4.4 | 4.5 | 0.4 | 0.5 |
|  | 33 | 146 | 14 | 4.4 | 4.5 | 0.4 | 0.7 |
|  | 40 | 195 | 5 | 3.5 | 3.2 | 4.8 | 0.3 |
|  | 40 | 195 | 10 | 4.1 | 3.6 | 2.3 | 0.7 |
|  | 40 | 195 | 14 | 4.4 | 4.5 | 0.4 | 0.7 |
|  | 40 | 195 | 25 | 3.8 | 3.7 | 0.2 | 4.2 |
|  | 50 | 315 | 14 | 4.4 | 4.2 | 1.6 | 3.2 |
|  | 60 | 378 | 14 | 4 | 3.8 | 2.1 | 7.4 |
|  | Control |  | 0 | 3.4 | 3.2 | 8.3 | 0 |
| Kiwi | 24 | 75 | 16 | 3.8 | 3.6 | 1.8 | 0.1 |
|  | 39 | 233 | 16 | 3.8 | 3.6 | 2 | 0.1 |
|  | 48 | 280 | 5 | 2.9 | 2.7 | 7.9 | 0 |
|  | 48 | 280 | 10 | 3.4 | 2.9 | 5.7 | 0.1 |
|  | 48 | 280 | 16 | 3.8 | 3.4 | 2.2 | 0.3 |
|  | 48 | 280 | 22 | 2.7 | 3.1 | 0.6 | 2.3 |
|  | 55 | 395 | 16 | 3.6 | 3.4 | 2.2 | 0.7 |
|  | 60 | 421 | 16 | 3.6 | 3.2 | 2.8 | 1.2 |
|  | 70 | 451 | 16 | 3.2 | 3.2 | 3.1 | 2.6 |
|  | Control |  | 0 | 2.6 | 2.4 | 14.6 | 0 |
| Melon (Charante) | 25 | 101 | 16 | 4.8 | 4.7 | 0.4 | 0 |
|  | 39 | 224 | 5 | 3.8 | 3.9 | 3.7 | 0 |
|  | 39 | 224 | 10 | 4.2 | 4.3 | 1.8 | 0.2 |
|  | 39 | 224 | 16 | 4.7 | 4.7 | 0.4 | 0.4 |
|  | 39 | 224 | 25 | 4.1 | 3.6 | 0.3 | 5.4 |
|  | 49 | 302 | 16 | 4.5 | 4.5 | 0.5 | 2.3 |
|  | 70 | 370 | 16 | 3.9 | 3.8 | 0.5 | 4.7 |
|  | Control |  | 0 | 3.5 | 3.4 | 6.3 | 0 |
| Pineapple | 25 | 125 | 18 | 4.4 | 4.7 | 1.3 | 0.2 |
|  | 43 | 208 | 5 | 3.9 | 3.9 | 5.1 | 0.4 |
|  | 43 | 208 | 12 | 4.4 | 4.7 | 1.7 | 0.5 |
|  | 43 | 208 | 18 | 4.3 | 4.5 | 1.6 | 0.6 |
|  | 43 | 208 | 25 | 3.8 | 3.8 | 1.1 | 3.8 |
|  | 55 | 339 | 18 | 4.3 | 4.5 | 1.6 | 0.6 |
|  | 60 | 489 | 18 | 4.2 | 4.2 | 2 | 3.6 |
|  | 70 | 731 | 18 | 4.2 | 4.2 | 2 | 5.3 |
|  | Control |  | 0 | 3.6 | 3.6 | 7.8 | 0 |
| Bell Pepper | 40 | 72 | 5 | 4 | 3.7 | 2.7 | 0 |
|  | 40 | 72 | 12 | 4.4 | 4.3 | 0.4 | 0 |
|  | 40 | 72 | 18 | 3.9 | 3.8 | 0.2 | 0 |
|  | Control |  | 0 | 3.6 | 3.4 | 3.3 | 0 |

The optimal parameters and corresponding experimental results for each of the various types of produce, based on the experimental results of the inventors, are shown in bold in Table 2.

As seen in Table 2, for Mangos, the optimal parameters and corresponding experimental results are generally as follows:
Drying Temperature: 40° C.
Drying Rate per Unit Area: 195 kg/(sec*m$^2$*10$^6$)
Dehydration Percentage: 14%
Turgor: 4.4 (on a scale of 0-5 with 5 being best)
General Taste Score: 4.5 (on a scale of 0-5 with 5 being best)
Drip Loss Percentage: 0.4%
Dried Tissue Layer Percentage: 0.7%

The optimal parameters and corresponding experimental results for Kiwi are as follows:
Drying Temperature: 39° C.
Drying Rate per Unit Area: 233 kg/(sec*m$^2$*10$^6$)
Dehydration Percentage: 16%
Drip Loss Percentage: 2%
Dried Tissue Layer Percentage: 0.1%

The optimal parameters and corresponding experimental results for Melon (Charante variety) are as follows:
Drying Temperature: 39° C.
Drying Rate per Unit Area: 224 kg/(sec*m$^2$*10$^6$)
Dehydration Percentage: 16%
Turgor: 4.7 (on a scale of 0-5 with 5 being best)
General Taste Score: 4.7 (on a scale of 0-5 with 5 being best)
Drip Loss Percentage: 0.4%
Dried Tissue Layer Percentage: 0.4%

The optimal parameters and corresponding experimental results for Pineapple are as follows:
Drying Temperature: 43° C.
Drying Rate per Unit Area: 208 kg/(sec*m$^2$*10$^6$)
Dehydration Percentage: 12%
Turgor: 4.4 (on a scale from 0-5 with 5 being best)

General Taste Score: 4.7 (on a scale from 0-5 with 5 being best)

Drip Loss Percentage: 1.7%

Dried Tissue Layer Percentage: 0.5%

The optimal parameters and corresponding experimental results for Bell Peppers are as follows:

Drying Temperature: 40° C.

Drying Rate per Unit Area: 72 kg/(sec*m$^2$*10$^6$)

Dehydration Percentage: 12%

Turgor: 4.4 (on a scale from 0-5 with 5 being best)

General Taste Score: 4.3 (on a scale from 0-5 with 5 being best)

Drip Loss Percentage: 0.4%

Dried Tissue Layer Percentage: 0%

It is appreciated that the optimal rate of moisture removal and the maximum moisture removal rates described hereinabove are a function of the condition of the agricultural produce prior to moisture removal. Thus, for example, the pieces 140 of mango described in the embodiment of FIG. 1C do not include an outer peel or rind which could affect the moisture removal process, while the arils 100 of FIG. 1A generally do include an outer peel 106. In the embodiment shown in FIG. 1B, the outer peel of arils 120 may have been damaged by the separation process by machine 122. It is appreciated that while the embodiment of FIG. 1B describes agricultural produce where the outer peel may have been damaged by nonmanual handling thereof, the optimal rate of moisture removal and the maximum moisture removal rates described therein may also apply to agricultural produce where the outer peel may have been damaged by manual handling thereof. It is appreciated that while the embodiment of FIG. 1C describes fresh cut agricultural produce, the optimal rate of moisture removal and the maximum moisture removal rates described therein may also apply to uncut agricultural produce where the outer peel may have been removed.

Figure 2A:
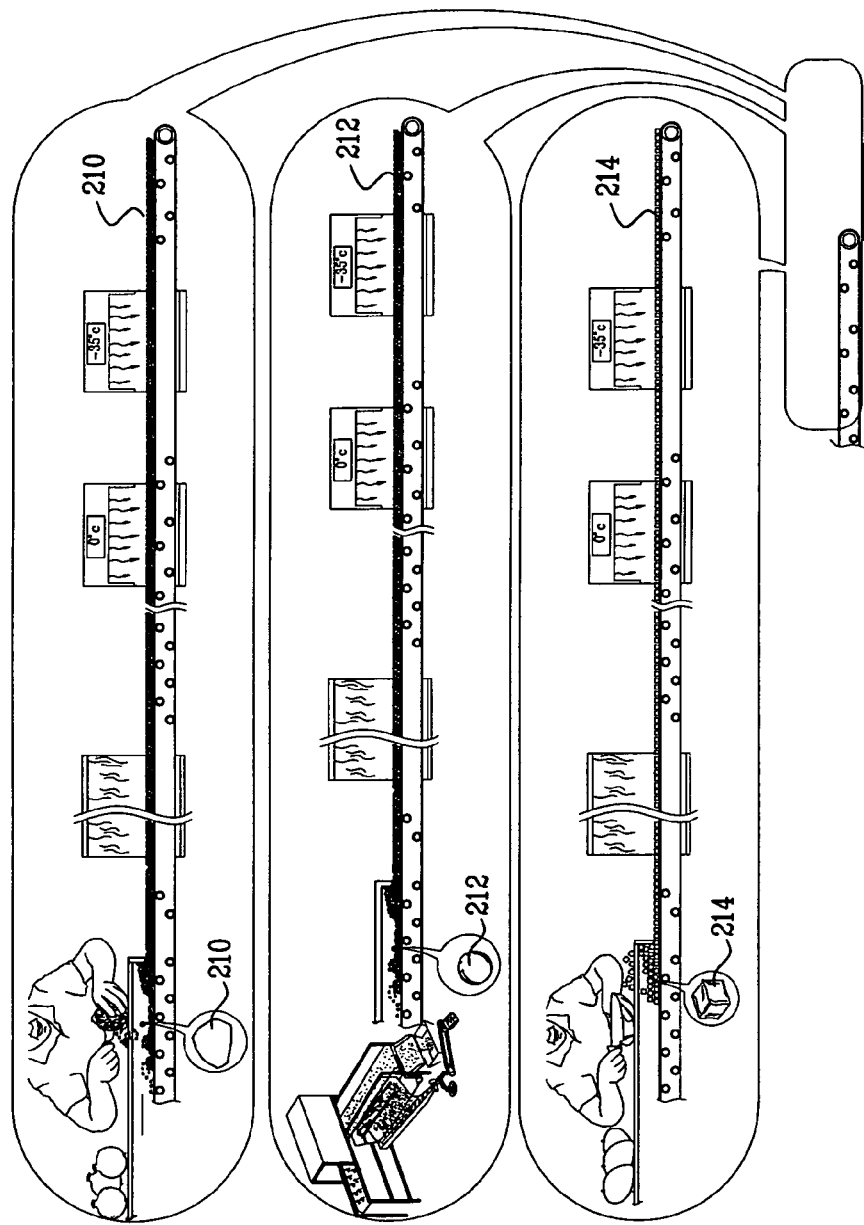
Figure 2A:
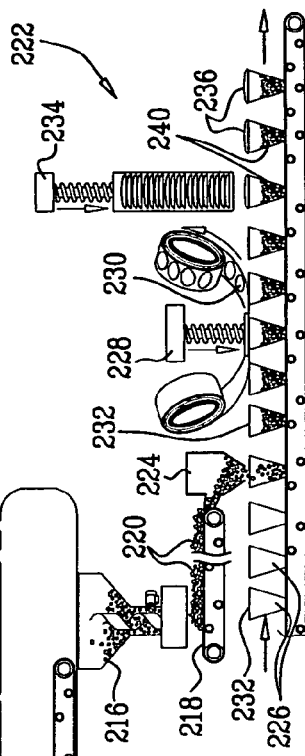

Reference is now made to FIGS. 2A, 2B and 2C, which are simplified illustrations of apparatus and techniques for freezing, packaging, storing, defrosting and utilizing agricultural produce in accordance with a preferred embodiment of the present invention.

As seen in FIG. 2A, agricultural produce, typically including at least one or both of uncut fresh produce and fresh cut produce, is preferably frozen in accordance with the present invention, preferably using techniques of the type described hereinabove with reference to FIGS. 1A-1C. These techniques preferably all include removing moisture from the fresh agricultural produce in an amount equal to between 5%-20% of the weight of the fresh agricultural produce at a rate which does not exceed predetermined thresholds depending on the nature of the produce as described hereinabove with reference to FIGS. 1A-1C and thereafter, freezing the fresh agricultural produce.

The frozen agricultural produce, preferably in bite-size pieces, is preferably mixed together in any suitable manner, and packaged in accordance with a preferred embodiment of the invention.

In the illustrated embodiment, uncut pomegranate arils 210, cherries 212 and fresh cut pieces 214 of mango are each frozen in accordance with the present invention and optionally supplied to a mixer 216. A conveyor 218 transports the mixed frozen produce 220 to a packaging station 222 which includes a filler 224, which fills cup-like packages 226 with the mixed frozen produce 220, a sealer 228, which applies a seal 230 onto a rim 232 of each package 226 and a capper 234, which attaches a removable, apertured cap 236 over seal 230 onto each package 226. The filled packages 240 may be shipped to retail outlets for retail distribution. It is appreciated that the freezing of various items of produce in accordance with a preferred embodiment of the invention need not take place at the same location and need not take place at the location where the subsequent packaging takes place.

As will be described in greater detail hereinbelow, it is a particular feature of the present invention that produce, frozen in accordance with a preferred embodiment of the present invention, is packaged in a package which enables water or other liquid to be added thereto to promote quick and homogeneous defrosting thereof. As seen particularly in FIG. 2B, when a consumer wishes to consume the frozen produce, he removes a filled package 240 from a freezer 242 as indicated by reference numeral 250, removes the cap 236, as indicated by reference numeral 252, removes the seal 230, as indicated by reference numeral 254, and adds water as indicated by reference numeral 256, preferably up to a line 260 indicated on the package 240. Preferably, after adding water, the consumer reattaches the cap 236 to the rim 232 of package 240, as indicated by reference numeral 258. After the package 240 is left at room temperature for at least a predetermined short time, typically 3-5 minutes, the produce in package 240 is fully defrosted. Alternatively, the package 240 may be defrosted in a microwave oven at high power for approximately 15-30 seconds. Following defrosting, the consumer pours out excess liquid through apertured cap 236, as indicated by reference numeral 260. The cap 236 may then be removed and discarded and the produce may be eaten.

It is a particular feature of the present invention that due to extremely low drip loss, the produce in the mixture is not discolored and the juices of the produce are not lost when pouring out the excess liquid, which is generally clear.

It is appreciated that any other suitable technique for defrosting the frozen produce, following addition thereto of water, may be employed. One example is the use of a microwave oven.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

The invention claimed is:

1. A method for preserving uncut fresh agricultural produce comprising:

manually handling said uncut fresh agricultural produce;

thereafter, removing moisture from said uncut fresh agricultural produce in an amount equal to between 5%-20% of the weight of said uncut fresh agricultural produce at a rate which does not exceed approximately $30 \times 10^{-6}$ kg moisture/sec per area unit of said produce in meter$^2$; and thereafter, freezing said uncut fresh agricultural produce.

2. A method according to claim 1 and wherein said removing moisture comprises removing moisture in an amount equal to approximately 10%-14% of said weight of said agricultural produce.

3. A method according to claim 1 and wherein said removing moisture comprises removing moisture in an amount equal to approximately 12% of said weight of said agricultural produce.

4. A method according to claim 1 and wherein said removing moisture comprises transporting said agricultural produce through a moisture removal chamber including at least one of a controlled temperature chamber, a controlled air flow chamber, a controlled temperature and air flow chamber, a microwave chamber, an infrared chamber, a convection chamber, a chamber having fluidized bed technology and a chamber having vacuum drying technology.

5. A method according to claim 1 and also comprising, prior to said freezing, pre-cooling said agricultural produce to a temperature between 0° C. and 5° C.

6. A method according to claim 1 and wherein said freezing comprises freezing said agricultural produce to a temperature between −40° C. and −35° C. by employing IQF freezing technology.

7. A method according to claim 1 and also comprising, following said freezing, adding liquid to said agricultural produce and defrosting said agricultural produce in the presence of said liquid.

8. A method for preserving uncut fresh agricultural produce comprising:
   non-manually handling said uncut fresh agricultural produce;
   thereafter, removing moisture from said uncut fresh agricultural produce in an amount equal to between 5%-20% of the weight of said uncut fresh agricultural produce at a rate which does not exceed approximately $60 \times 10^{-6}$ kg moisture/sec per area unit of said produce in meter$^2$; and
   thereafter, freezing said uncut fresh agricultural produce.

9. A method according to claim 8 and wherein said removing moisture comprises removing moisture in an amount equal to approximately 10%-14% of said weight of said agricultural produce.

10. A method according to claim 8 and wherein said removing moisture comprises removing moisture in an amount equal to approximately 12% of said weight of said agricultural produce.

11. A method according to claim 8 and wherein said removing moisture comprises transporting said agricultural produce through a moisture removal chamber including at least one of a controlled temperature chamber, a controlled air flow chamber, a controlled temperature and air flow chamber, a microwave chamber, an infrared chamber, a convection chamber, a chamber having fluidized bed technology and a chamber having vacuum drying technology.

12. A method according to claim 8 and also comprising, prior to said freezing, pre-cooling said agricultural produce to a temperature between 0° C. and 5° C.

13. A method according to claim 8 and wherein said freezing comprises freezing said agricultural produce to a temperature between −40° C. and −35° C. by employing IQF freezing technology.

14. A method according to claim 8 and also comprising, following said freezing, adding liquid to said agricultural produce and defrosting said agricultural produce in the presence of said liquid.

15. A method for preserving fresh cut agricultural produce comprising:
   removing moisture from said fresh cut agricultural produce in an amount equal to between 5%-20% of the weight of said fresh cut agricultural produce at a rate which does not exceed approximately $300 \times 10^{-6}$ kg moisture/sec per area unit of said produce in meter$^2$; and
   thereafter, freezing said fresh cut agricultural produce.

16. A method according to claim 15 and wherein said removing moisture comprises removing moisture in an amount equal to approximately 10%-14% of said weight of said agricultural produce.

17. A method according to claim 15 and wherein said removing moisture comprises removing moisture in an amount equal to approximately 12% of said weight of said agricultural produce.

18. A method according to claim 15 and wherein said removing moisture comprises transporting said agricultural produce through a moisture removal chamber including at least one of a controlled temperature chamber, a controlled air flow chamber, a controlled temperature and air flow chamber, a microwave chamber, an infrared chamber, a convection chamber, a chamber having fluidized bed technology and a chamber having vacuum drying technology.

19. A method according to claim 15 and also comprising, prior to said freezing, pre-cooling said agricultural produce to a temperature between 0° C. and 5° C.

20. A method according to claim 15 and wherein said freezing comprises freezing said agricultural produce to a temperature between −40° C. and −35° C. by employing IQF freezing technology.

21. A method according to claim 15 and also comprising, following said freezing, adding liquid to said agricultural produce and defrosting said agricultural produce in the presence of said liquid.

22. A method of storing agricultural produce comprising:
   removing moisture from said agricultural produce in an amount equal to between 5%-20% of the weight of said agricultural produce at a rate which does not exceed approximately $300 \times 10^{-6}$ kg moisture/sec per area unit of said produce in meter$^2$;
   thereafter, freezing said agricultural produce; and
   thereafter, adding liquid to said agricultural produce and defrosting said agricultural produce in the presence of said liquid.

23. A method for storing agricultural produce comprising:
   removing moisture from said agricultural produce in an amount equal to between 5%-20% of the weight of said agricultural produce at a rate which does not exceed approximately $300 \times 10^{-6}$ kg moisture/sec per area unit of said produce in meter$^2$;
   thereafter, freezing said agricultural produce and storing it in a container for storing frozen agricultural produce and having a container opening;
   sealing the opening of said container;
   storing said container containing said agricultural produce under freezing conditions;
   unsealing the opening of said container;
   supplying a liquid to said agricultural produce in said container;
   defrosting said agricultural produce in said container in the presence of said liquid;
   removably attaching an apertured cap to said container and pouring out said liquid from said container through said apertured cap, thereby permitting said liquid, but not said produce, to pass out of said container.

24. A method according to claim 23 and wherein different types of said agricultural produce are mixed together.

25. A method according to claim 23 and wherein said defrosting comprises defrosting said agricultural produce at room temperature for a duration of approximately 3 to 5 minutes.

26. A method according to claim 23 and wherein said defrosting comprises defrosting said agricultural produce in a microwave oven for a duration of approximately 15 to 30 seconds.

* * * * *